(No Model.)

E. F. DIETERICHS.
CAR FENDER AND BRAKE.

No. 562,288. Patented June 16, 1896.

WITNESSES
Chas. K. Davies.
H. E. Vandeventer.

INVENTOR
E. F. Dieterichs
By W. H. Bartlett
Attorney

ANDREW B.GRAHAM, PHOTO-LITHO. WASHINGTON.D.C

UNITED STATES PATENT OFFICE.

EMIL F. DIETERICHS, OF CLEVELAND, OHIO, ASSIGNOR TO CLARISSA REED DIETERICHS, OF SAME PLACE.

CAR FENDER AND BRAKE.

SPECIFICATION forming part of Letters Patent No. 562,288, dated June 16, 1896.

Application filed August 15, 1895. Serial No. 559,380. (No model.)

*To all whom it may concern:*

Be it known that I, EMIL F. DIETERICHS, residing at Cleveland, in the county of Cuyahoga and State of Ohio, have invented certain new and useful Improvements in Car Fenders and Brakes, of which the following is a specification, reference being had therein to the accompanying drawings.

This invention relates to brakes and fenders for street-cars.

The object of the invention is to so connect the fender or guard of a street-car with the car that it may act at all times as a fender, and when applied as a brake may act suddenly to check the momentum of the car and be even more efficient as a fender, in manner as will be described.

Figure 1:
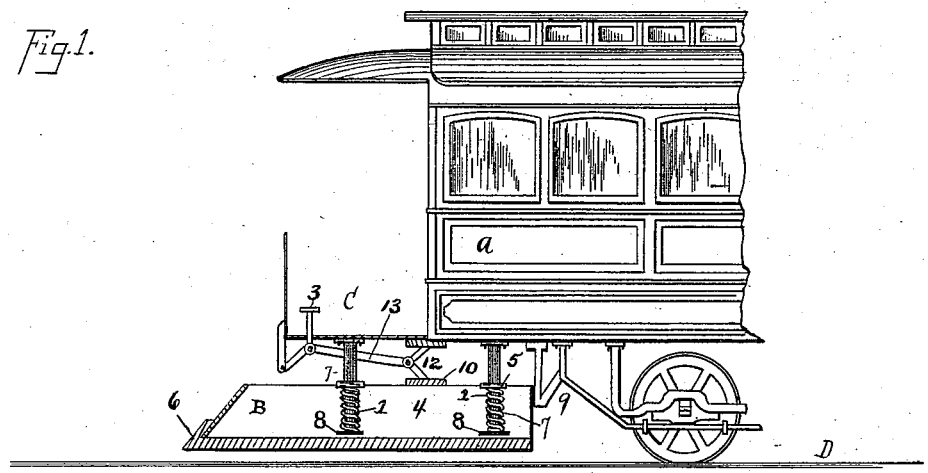
Figure 2:
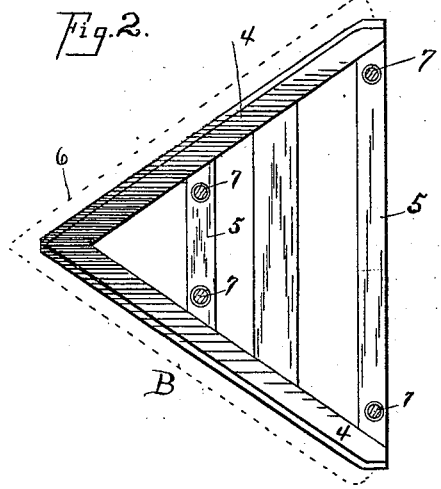
Figure 4:
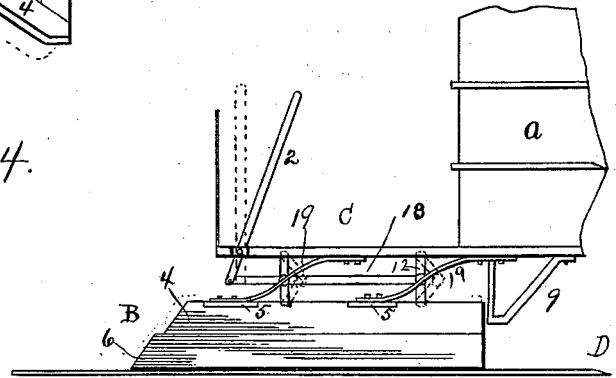

Figure 1 is a broken side elevation of a street-car, showing platform and fender in section. Fig. 2 is a bottom plan of the fender of Fig. 1 with parts omitted. Fig. 2 is a diagram showing fender on the track and indicating one form of lever mechanism for operating the same. Fig. 4 is a broken side elevation showing a different form of supporting-springs connecting fender to car.

The letter A indicates a street-car, which may be of any usual or approved construction. The fender B is preferably under the front platform of the car, and may project a little in front thereof, or may be smaller or larger in relative proportions than indicated in the drawings.

The fender is in plow form and is designed to be supported about under the platform C of the car by springs 1 1, which retain the fender normally at such elevation as to run free of obstructions and parallel with the track D.

The fender is applied as a brake by operating the hand-lever 2, or the foot-lever 3, so as to press the fender down upon the way with great force. The fender then slides along the surface until it checks the movement of the car, at the same time hugging the way so closely that nothing of large size can enter between the fender and the track or way.

The fender has its lower edge at all times about parallel with the track and road-bed, and when forced down on said bed the cushion presents a large frictional surface thereon, and quickly checks the movement of the car, while at the same time preventing the entrance of anything of considerable size between the road-bed and fender. The fender rises or falls vertically, by reason of the vertical standards 7, which guide and support the fender.

The plow, brake, or fender B has inclined side pieces 4 4, held at suitable angle to each other by cross-bars 5 5, or in other suitable manner. The lower faces and edges of these plates are preferably covered with heavy cushions 6 6, of rubber, or other elastic or flexible material. The lower edges of these cushions form the wearing-shoe of the brake.

The fender is in one form supported from the car by standards 7 7, dependent from the car or platform, and joined by cross-bars 8 8. The standards 7 extend through holes in the brace-bars 5. The lower ends of the standards support springs 1, by cross-bars 8 or otherwise, and the brace-bars and fenders are normally held up by said springs. When forced down against the resistance of the springs, the fender moves vertically, guided by the standards. The whole structure may be strengthened by abutments 9, connected to the car just in rear of the fender, in position to take the strain from the standards when the brake is suddenly applied, by bearing against the rear end of the brake or fender.

The fender may be operated as a brake by the motorman in any one of several ways. Fig. 1 shows toggle-levers 12, connected to the platform and to a bar 10 of the fender. This toggle is straightened by pressure on foot-lever 3, connected by link 13 with toggle 12, forming, as shown in Fig. 1, a double toggle-lever.

The driver, brakeman, or motorman, seeing the car likely to run down any person, applies his foot to lever 3, thus pressing the fender B firmly down on the track. The fender thus acts as a brake, by the contact of a large friction-surface with the way, and extending entirely across the way. The plow form of the device will cause any person or obstruction in front of the car to be thrust sidewise by the fender.

The close contact with the street or way prevents any person, or even the hand or foot of a person, from getting under the fender. The large friction-surface having direct contact with the road or way insures that the car shall be speedily checked, when the fender is thus applied as a brake.

As soon as pressure is removed from the lever 3 the fender will be raised by the springs.

As the fender is never to be used as a brake except in cases of emergency, the shoe or pad 6 need not be worn out rapidly, as it would be if the fender were often applied as a brake.

Figure 3:
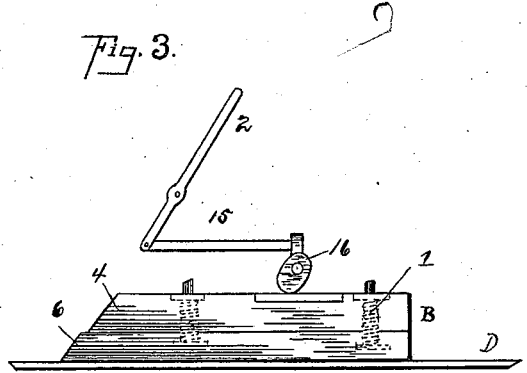

In Fig. 3 a hand-lever 2 is shown as the operating means, by which draw-rod 15 is made to turn the cam or eccentric 16, and so depress the fender, in a manner which will be readily understood by practical mechanics.

In Fig. 4 the fender is shown as supported by plate-springs 19 instead of spiral springs, as has been described, the toggle-levers 12 being connected to lever 2 by push-bar 18.

In every case it will be understood that the brake or fender B is normally held up, and is lifted when down, or vice versa, by suitable springs connected to the fender and car, and that the fender may be applied as a brake by the quick movement and manipulation of suitable levers.

In motor-cars a fender should be applied at each end, so that whichever end of the car moves foremost, the wheels will be suitably covered.

What I claim is—

1. The combination with a platform of a car of a plow-fender composed of side pieces inclined from the perpendicular and strongly braced, and having heavy elastic cushions at their lower edges in position to bear entirely across the way, toggle-levers connected to said plow and the car-platform, and under control of the operator to permit strong vertical pressure on the plow, and springs connected to the plow and platform and tending to lift the plow, all substantially as described.

2. The combination with the platform of a street-car, a plurality of vertical standards dependent from the platform of said car, a plow having braces or bars with holes therein through which said standards pass, springs connected to the standards and bearing upward on said bars, and a lever mechanism connected to the platform and plow, in position to depress the plow against the action of the springs all combined substantially as described.

3. In combination with the platform of a street-car, a plurality of vertical standards pendent therefrom, a vertically-movable plow having cross-bars with holes through which said standards pass, means for raising and lowering the plow on the standards, and an abutment on the car against which the rear edge of the plow rests, all combined substantially as described.

4. The car-platform, the car arranged under said platform and having its lower surface extending entirely across the way and parallel with the surface of said way, springs for retaining said plow normally in elevated position and lever mechanism connected to the plow and platform, whereby the plow may be depressed and held to bear with its lower surface entirely across and along the way, all combined substantially as described.

In testimony whereof I affix my signature in presence of two witnesses.

EMIL F. DIETERICHS.

Witnesses:
CHAS. A. STEBBINS,
ALFRED CLUM.